United States Patent [19]

Nemeth et al.

[11] Patent Number: 5,381,022

[45] Date of Patent: Jan. 10, 1995

[54] COMBINED OPTICAL WAVEGUIDE AND PRISMATIC LIQUID-LEVEL SENSOR

[75] Inventors: Frank A. Nemeth, Harwinton; James B. Dockendorff, North Haven, both of Conn.

[73] Assignee: IMO Industries, Inc., Princeton, N.J.

[21] Appl. No.: 164,325

[22] Filed: Dec. 10, 1993

[51] Int. Cl.⁶ ............................................. G01N 15/06
[52] U.S. Cl. .................................... 250/577; 250/903; 73/293
[58] Field of Search ........... 250/577, 902, 903, 227.31; 73/293; 340/619, 620; 385/12, 36; 356/136

[56] References Cited

U.S. PATENT DOCUMENTS

| | | | |
|---|---|---|---|
| 3,141,094 | 7/1964 | Strickler | 340/619 |
| 3,683,196 | 8/1972 | Obenhaus | 250/903 |
| 3,751,672 | 8/1973 | Michel et al. | 250/903 |
| 4,345,180 | 10/1982 | Harding | 73/293 |
| 4,713,552 | 12/1987 | Denis et al. | 250/903 |
| 4,880,990 | 11/1989 | Rando | 250/577 |
| 4,979,791 | 12/1990 | Nemeth | 250/903 |
| 4,998,022 | 3/1991 | Tregay | 73/293 |

FOREIGN PATENT DOCUMENTS 0263452 10/1988 Japan ................................. 356/136

Primary Examiner—David C. Nelms
Assistant Examiner—Stephone B. Allen
Attorney, Agent, or Firm—Hopgood, Calimafde, Kalil & Judlowe

[57] ABSTRACT

In its preferred embodiment, a one-piece optical-prism sensor of liquid level internally incorporates waveguide structure, i.e., within the otherwise conventional conical external profile of the prism, the waveguide being a thin flat member which includes three parallel spaced axes, namely, the axis of light input, the central axis of the cone, and the axis of detection of such light as exits the prism. The conical shape of the prism is essentially a hollow conical shell, within which the waveguide extends in essentially a single diametrical plane, with integral connection of the shell to the diametric limits of the waveguide. The net result is that light enters the waveguide on the input axis and, to the extent that the light is internally reflected, the waveguide so confines internal reflection that scattering is very substantially reduced, and essentially all the internally reflected light will exit on the detection axis. And, for the case of liquid exposure to the outer surface of the prism, refraction into the liquid is more effective, while any internal reflected-light scattering is again very substantially reduced. Thus, by having so materially reduced internally reflected scattering, the sensor offers greatly enhanced sensitivity to the difference between a liquid exposure and a no-liquid (e.g. air) exposure of the prism.

15 Claims, 2 Drawing Sheets

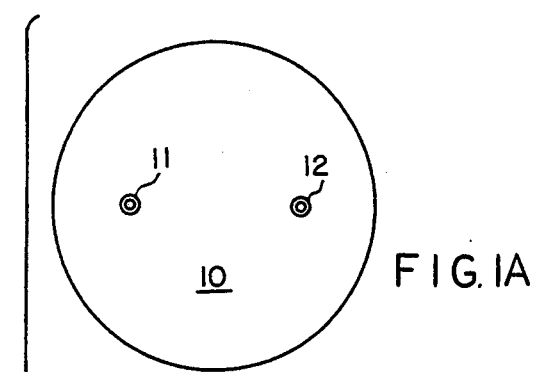
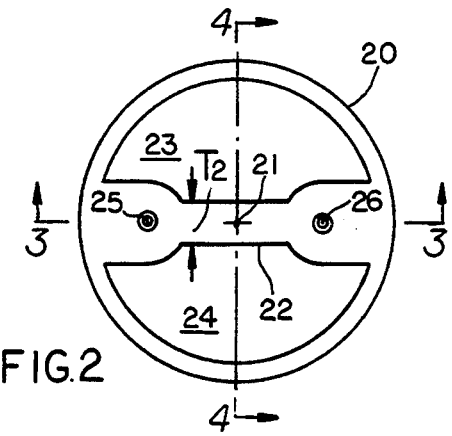
FIG. 1A
FIG. 2
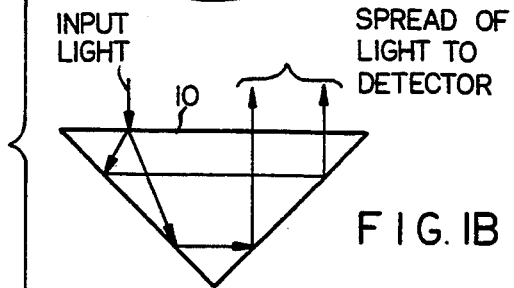
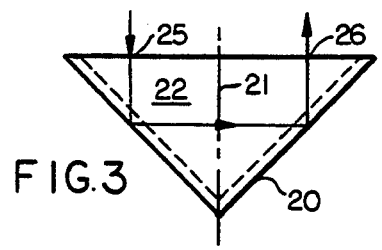
FIG. 1B
FIG. 3
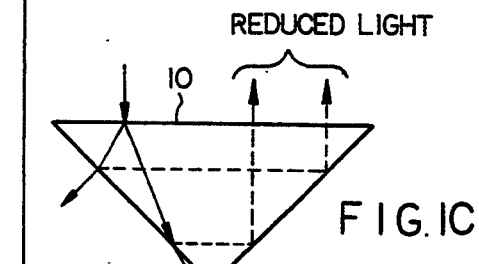
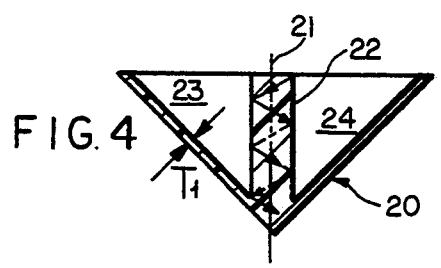
FIG. 1C
FIG. 4
PRIOR ART
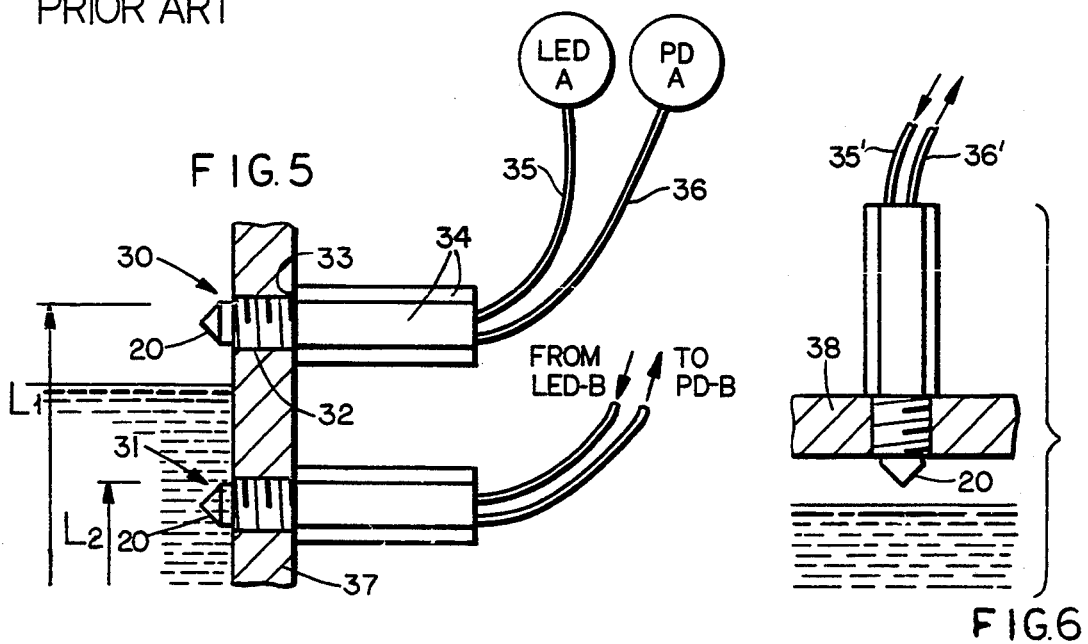
FIG. 5
FIG. 6

COMBINED OPTICAL WAVEGUIDE AND PRISMATIC LIQUID-LEVEL SENSOR

BACKGROUND OF THE INVENTION

The invention relates to liquid-level sensors of prismatic construction wherein one or more optical paths into the prism are altered by the presence of a liquid-to-prism interface, as compared to an air-to-prism interface, and wherein light which exits the prism is a function of whether the prism has interface with liquid or with air.

A variety of solid prismatic liquid-level sensors are commercially available, to indicate the presence or absence of liquid at contact with the prism, via reflection of light in the prism or for refraction of light out of the prism, refracted light being dissipated in the liquid. Such prisms are conventionally made of a transparent glass or plastic material. Experience has shown that light injected to such a solid prism tends to scatter and to fill the entire prism; this type of prism is very sensitive to adherent liquid drops and condensation, on operative facets of the prism. Moreover, such solid prisms are not extremely accurate since the sensitive area of the prism (i.e., where refraction-sensing occurs) may vary from prism to prism.

Accompanying FIGS. 1A, 1B and 1C of the drawings are simple diagrams to illustrate problems of known solid-type liquid-level prism sensors of the character indicated. The prism is a solid cone having a 90-degree apex angle and having a flat circular base 10 (FIG. 1A) with two ports 11, 12 at equal but opposite offset from the cone axis, respectively for passage of input light at port 11 into the prism and for passage of any exiting light at port 12 out of the prism, i.e., for any light which seeks to exit at port 12. The light may be supplied to port 11 by any convenient source such as a light-emitting diode, with or without an optical fiber port connection.

In the case of prism exposure to air (FIG. 1B), input light encounters some divergence of limiting rays, which are internally reflected twice before emerging exit from the prism. And due to the noted divergence on prism entry, there is a relatively wide spread of locations at which internally reflected light will exit the prism. The wider this spread, the more inefficient is the ability to obtain a proper photosensitive response to the exiting light.

In the case of prism exposure to or immersion in a liquid, such as water or a fuel (FIG. 1C), input light is refracted from the prism/liquid interface and is absorbed (dissipated) in the liquid. This circumstance results in little or no internally reflected light available to whatever photosensitive device may be employed for response to exiting light. Thus, the decrease in detected exit light response is an indicator of detected liquid at the level at which the prism has been mounted.

BRIEF STATEMENT OF THE INVENTION

It is the primary object of the invention to provide an improved optical-prism construction for use in liquid-level sensing, such that internal scattering is substantially reduced as compared with such prisms to date. Stated in other words, it is the object of the invention to provide an optical-prism construction which is inherently capable of substantially increased optical-output signal differentiation, as between the conditions of liquid exposure and no liquid exposure to the operative reflective/refractive interface surfaces of the prism.

Another object is to achieve the foregoing objectives in a construction which lends itself to one-piece unitary molded-plastic manufacture.

The invention in a preferred embodiment achieves the above objects and certain further features and advantages in a one-piece moldable optical-sensor construction wherein an optical waveguide is incorporated within the otherwise conventional conical external profile of the prism, the waveguide being a thin flat member which includes three parallel spaced axes, namely, the axis of light input, the central axis of the cone, and the axis of detection of such light as it exits the prism. The conical shape of the prism is essentially a hollow conical shell, within which the waveguide extends in essentially a single diametrical plane, with integral connection of the shell to the diametric limits of the waveguide. The net result is that light enters the waveguide on the input axis and, to the extent that the light is internally reflected, the waveguide so confines internal reflection that scattering is very substantially reduced and essentially all the internally reflected light will exit on the detection axis. And, for the case of liquid exposure to the outer surface of the prism, refraction into the liquid is more effective, while any internal reflected-light scattering is again very substantially reduced. Thus, by having so materially reduced internally reflected scattering, the sensor offers greatly enhanced sensitivity to the difference between a liquid exposure and a no-liquid (e.g. air) exposure of the prism.

BRIEF DESCRIPTION OF THE DRAWINGS

The invention will be described in detail in conjunction with the accompanying drawings, in which:

FIGS. 1A, 1B and 1C are diagrams in aid of discussion of an illustrative prior art optical prism for liquid-level detection; specifically:

FIG. 1A is a plan view of the illustrative prior art optical prism;

FIG. 1B is a view in vertical section of the prior art prism of FIG. 1A, for the condition of air exposure; and FIG. 1C is the view of FIG. 1B, for the condition of liquid exposure of the prism;

FIG. 2 is a plan view similar to FIG. 1A, to illustrate principles involved in a prism of the invention;

FIG. 3 is a view in vertical section of the prism of FIG. 2, for the condition of air exposure and taken at the plane 3—3 of FIG. 2;

FIG. 4 is another view in vertical section, taken at the plane 4—4 of FIG. 2;

FIG. 5 is a simplified and fragmentary diagram to illustrate a prism of the invention applied in vertically spaced multiple for detection of different liquid levels in a tank;

FIG. 6 is another simplified and fragmentary diagram to illustrate a prism of the invention applied to the top of a tank, for detection of a filled condition of the tank;

DETAILED DESCRIPTION OF THE INVENTION

Figure 7:
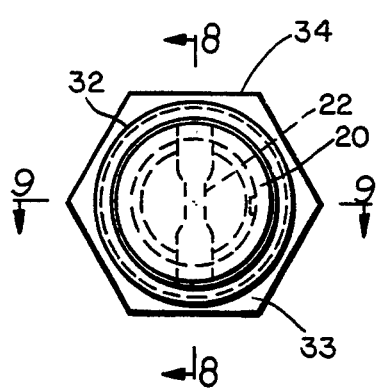
FIG. 7 is a view in distal-end elevation of a preferred specific optical-sensor embodiment of the invention.
Figure 8:
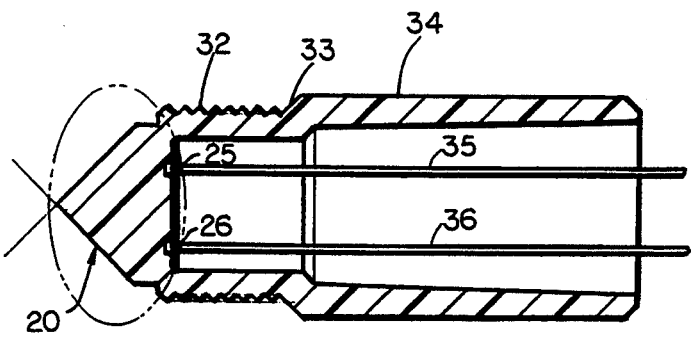
FIG. 8 is a view in longitudinal section of the sensor of FIG. 7, taken in the plane 8—8 of FIG. 7.
Figure 9:
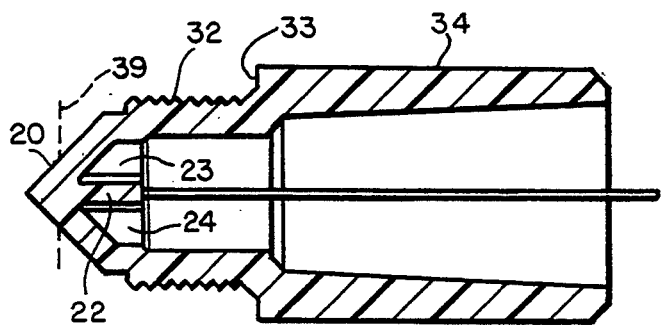
FIG. 9 is a view in longitudinal section of the sensor of FIG. 7, taken in the plane 9—9 of FIG. 7.
Figure 10:
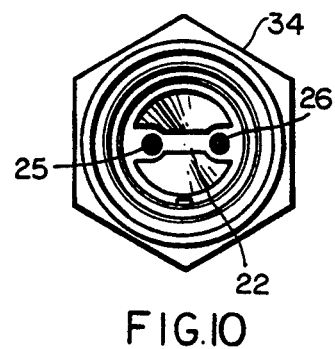
FIG. 10 is a view in proximal-end elevation of the sensor of FIG. 7, but as seen for the orientation of FIG. 9.

The prior art has already been discussed in connection with FIGS. 1A, 1B and 1C. Against that background, principles of the invention will be discussed, initially in connection with FIGS. 2, 3 and 4.

In contrast to the solid-cone construction of the prior art, the preferred form of the invention relies essentially on a conical shell 20 having (1) the same central axis 21, (2) the same apex angle of substantially 90° at its distal end, and (3) the same peripherally continuous circle around the base plane of the conical shell. The shell 20 has a wall thickness $T_1$ such that a conical cavity can exist within the shell; and a relatively thin waveguide element 22 of effective thickness $T_2$ is centered on axis 21 and spans a diameter within shell 20, being integrally formed with shell 20 on the same diametral plane, thereby dividing the interior of the shell into two smaller cavities 23, 24 which are never to be exposed to the liquid to be sensed. As in the prior art, the prism of FIGS. 2, 3 and 4 is adapted (1) to receive input light at 25 on an axis parallel to and offset to one lateral side of the central axis 21, and (2) to discharge light at exit 26 from the prism, on an exit axis that is also parallel to the central axis 21 but at an offset which is equal and opposite to the offset of input axis 25. Preferably, and as seen in FIG. 2, the contour of waveguide 22 bulges arcuately around the locations 25, 26 of input light and exit light, whereby to enable a degree of directional action on internally reflected light, to assure maximum passage of internally reflected light through waveguide 22, while at the same time assuring maximum return of internally reflected light for directed prism-exit passage at 26. Since the waveguide element 22 has wall surfaces which are always exposed to air (i.e., no liquid exposure), any stray reflections are minimal or are redirected only through the waveguide, it being suggested by zig-zag markings within waveguide 22 in FIG. 4 that such stray reflections may be reflected many times in the course of waveguide confinement, in their passage to the exit axis 26.

In FIG. 5, a prism sensor of the invention is provided in duplicate (30, 31) at each of a plurality of different levels $L_1$, $L_2$ at which liquid level is to be separately sensed. The described conical prism 20 will be understood to project horizontally, with the distal apex end either immersed in a liquid exposure, as at 31, or in an air (or other gaseous) exposure as at 30. The described prism and its internal waveguide feature will be further understood to provide an integrally formed cup-like closure of the distal-end of what is otherwise an elongate tubular member, wherein mounting threads 32, a generally radially outward shoulder 33, and external wrench flats 34 characterize the proximal end of prism 20. Within the tubular volume of parts 32, 33, 34, an LED element may be mounted to provide a light source for input to the prism on axis 25, and in analogous fashion a photodetector element may be mounted for axially directed exit-light response on axis 26. However, in the form shown, separate glass-fiber lines 35, 36 having termination coupling to the waveguide portion of the prism 20 at sensing level $L_1$, on the respective alignments 25, 26, provide flexible light communication from a remotely located source (LED-A) and exit-light delivery to a remotely located photodetector (PD-A). Similar provision for the prism 20 of sensor 31 will be understood to be similarly and remotely coupled to another light source (LED-B) and to deliver exit light to a remote photodetector (PD-B), as suggested by legend. In each case, installation in an upstanding tank wall 37 may be via wrenched advance of threaded region 32 into a suitably tapped mounting hole in wall 37.

FIG. 6 illustrates a vertically downward orientation of a single prism 20 at threaded mounting in the top wall 38 of a tank, wherein detected cut-off of what had been a steady internal-reflection signal via exit line 36' provides an indication that prism 20 has now been immersed by liquid within the tank, meaning that input light is now refracted into the liquid, so that the tank is full and should not be further loaded with liquid.

FIGS. 7 to 10 provide further detail as to the unitary construction which serves to position the convex outer surface of the conical shell for exposure either to air or to liquid, for generation of a maximum strength signal, e.g., at photodetector A (PD-A), indicating maximum internal reflection for air exposure; on the other hand, minimum (or zero) signal from the photodetector indicates that prism 20 has been immersed, at least to the extent of the axially projected profile of waveguide 22. In FIG. 7, this axially projected profile is the diametrically extending region delineated by and between the dashed-line showing of waveguide 22 and its bulbous arcuate formations around the respective light-input and light-exit axes at 25, 26 (see also FIG. 10). Also, in FIG. 8, it is indicated that input and output glass-fiber lines 35, 36 to and from prism 20 are coupled to waveguide 22 on axes 25, 26, via suitable local socket recesses at 25, 26.

Figure 11:
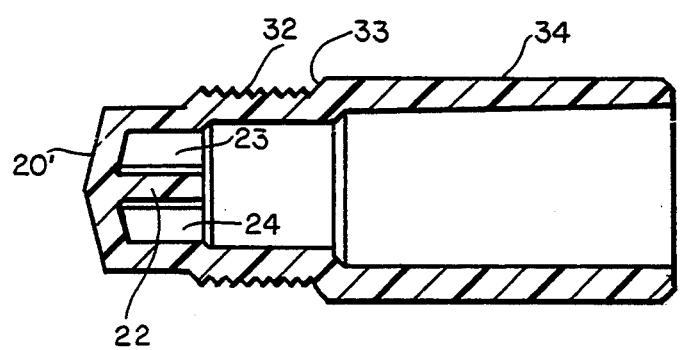
FIG. 11 is a view similar to FIG. 10, in the case of a modification for which the section of FIG. 8 is also applicable.

Thus far, it has been indicated that in its preferred embodiment the invention relies on a conical exterior profile for the containment and cooperative utilization of waveguide 22. But since the waveguide 22 is essential to the purposes and advantages of the invention, as are also the diametrically opposite shell regions contiguous to the waveguide, the remaining conically arcuate sectors of the optical prism 20 of FIGS. 7 to 10 are arcuate portions of the shell per se and need not be conically arcuate. In fact, the purposes and advantages of the invention are well and properly served whatever the distal shape of prism 20, as long as, for the indicated section of waveguide 22 that is geometrically axially projected to the exterior surface of prism 20, the external surface of the prism has diametrically opposite areas which converge to a substantially 90° apex angle on the central axis of the structure. Thus, instead of a geometric cone for the exterior surface of prism 20, the distal end may be formed by convergent flat surfaces, local to the said geometric axial projection of the waveguide 22, wherein these local flat surfaces are portions of two more extensive convergent flat surfaces. In this circumstance of two convergent flat surfaces, e.g., as if each of the two flat surfaces were orthogonal to each other and extended perpendicular to the section plane of FIG. 8, the section shown in FIG. 8 would be equally applicable. And for the section taken at 90° from the plane of FIG. 8, namely for the section plane of FIG. 9, the distal profile in the section would be a straight transverse line, as in the alignment suggested by dashed line 39 in FIG. 9. Thus, FIG. 11 at its distal end (in the section plane 9—9 of FIG. 7) is seen to be intermediate the straight transverse alignment 39 of FIG. 9 and the conical slope shown in full lines in FIG. 9. Yet the purposes of the invention are nevertheless served by the construction of FIG. 11, taken with the quadrature section of FIG. 8, because the substantially 90° apex-angle slope at the distal end of the outer surface of the prism is still available for the described internal-reflection/external-refraction functions of the prism, it being noted that in all such variations in distal profile of the prism, the sidewalls of the waveguide 22 remain exposed only to air, whatever the liquid or gaseous exposure of the external surface of the prism.

The described invention will be seen to meet the stated objects. The optical waveguide 22 provides a thin rib of transparent material which may be glass or a suitable plastic, establishing a light path between diametrically opposite local prism faces, or areas. Light becomes trapped or confined within and by the waveguide, due to the continuous circumstance of the difference between the refractive index of prism material and the refractive index of air, in cavities 23, 24. As light propagates through prism 20 (i.e., through the waveguide 22, as in FIG. 3), it is also confined laterally, as is apparent in FIGS. 4, 9 and 11. This confinement is due to the waveguiding effect and eliminates the light scatter inherent in prior art solid-prism design, FIGS. 1A, 1B, 1C. Since the reflected-light is more confined, the sensing area of the prism is in a smaller, more precise area (see FIG. 4). This circumstance allows for more accurate sensing, and is accompanied by reduced sensitivity to liquid drops and/or condensation on exposed distal-end surfaces of the prism.

What is claimed is:

1. As an article of manufacture, a unitary prismatic liquid-level sensor body of light-transmitting material, said body comprising a proximal base portion having a central axis and adapted for selective mounting to a container for liquid and at an elevation at which instantaneous presence or absence of liquid is to be sensed; said body extending distally from said base portion as an integrally formed convergent shell which, in at least one geometric plane that includes said axis, has an apex on said axis and an apex angle of substantially 90 degrees, and a relatively narrow flat waveguide element extending within said shell and including said axis, said waveguide element being integrally united with said shell in the region of shell convergence, said waveguide element having a proximal surface extending transverse to said axis, said surface being adapted for light-beam passage on alignments that are parallel to each other and to said axis at each of two ports which are at symmetrically opposite offsets from the central axis.

2. The article of claim 1, in which said base portion is tubular about said axis and is externally formed with mounting threads.

3. The article of claim 1, in which said base portion is also tubular in a further-proximal region with respect to the external threads, and in which the exterior of said further-proximal region is characterized by wrench flats.

4. The article of claim 3, in which a circumferentially continuous radially outward shoulder formation separates the external threads from the wrench flats of said further-proximal region.

5. The article of claim 1, in which said integrally formed convergent shell is conical.

6. The article of claim 1, in which said waveguide element is of thickness less than the transverse span between inner wall-surface portions of said shell, for substantially the axial extent of said shell, whereby to establish an interface with air for the substantial extent of said waveguide.

7. The article of claim 1, in which first and second optical-fiber elements are respectively end-connected to said ports.

8. The article of claim 1, in which a light-emitting diode is coupled to one of said ports and a photodetector is coupled to the other of said ports.

9. The article of claim 1, in which a light-emitting diode is coupled via an optical-fiber element to one of said ports and a photodetector diode is coupled via another optical-fiber element to the other of said ports.

10. The article of claim 1, in which opto-electronic means including a light source is coupled to one of said ports, said opto-electronic means including photo-sensitive means coupled to the other of said ports.

11. The article of claim 10, in which each of said couplings includes an optical-fiber connection to one of said ports.

12. The article of claim 1, in which said waveguide element is widened near its integral connections with said shell.

13. The article of claim 12, in which the widenings of said connections include a bulbous formation around each of said ports.

14. As an article of manufacture, a unitary prismatic liquid-level sensor body of light-transmitting material, said body comprising a conical shell having a central longitudinal axis between axially spaced base and apex ends, a thin flat waveguide element centered on said axis on a diametral plane within said shell and integrally united to said shell, and body-mounting means at the base end of said shell, said waveguide element having at said base end a surface extending transverse to said axis, said surface being adapted for light-beam passage on alignments that are parallel to each other and to said axis at each of two ports which are at symmetrically opposite offsets from the central axis.

15. As an article of manufacture, a unitary prismatic liquid-level sensor body of light-transmitting material having a proximal base portion that is (a) circular about a central axis, and (b) adapted for selective mounting to a container for liquid and at an elevation at which instantaneous presence or absence of liquid is to be sensed, said body extending distally from said base portion as an integrally formed convergent conical shell about said axis and having an apex angle of substantially 90 degrees, and a relatively narrow flat waveguide element extending diametrically within said conical shell and integrally united at juncture with said shell in the region of conical convergence, said waveguide element having a diametrically extending proximal surface and being adapted for light-beam passage on alignments that are parallel to each other and to said axis at each of two ports which are at symmetrically opposite offsets from the central axis.

* * * * *

UNITED STATES PATENT AND TRADEMARK OFFICE
CERTIFICATE OF CORRECTION

PATENT NO. : 5,381,022
DATED : January 10, 1995
INVENTOR(S) : Frank A. Nemeth, et. al.

It is certified that error appears in the above-indentified patent and that said Letters Patent is hereby corrected as shown below:

Title page, item [75] Inventors: should read--Frank A. Nemeth, Harwinton; James B. Dockendorff, North Haven; Dale Webbm Glastonbury, all of Connecticut--.

Signed and Sealed this

Twenty-eight Day of March, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,381,022

DATED : January 10, 1995

INVENTOR(S) : Frank A. Nemeth, et al

It is certified that error appears in the above-identified patent and that said Letters Patent is hereby corrected as shown below:

Title page, item [75] Inventors: should read --Frank A. Nemeth, Harwinton; James B. Dockendorff, North Haven; Dale Webb Glastonbury, all of Connecticut--.

Signed and Sealed this

Sixteenth Day of May, 1995

Attest:

BRUCE LEHMAN

Attesting Officer

Commissioner of Patents and Trademarks